May 22, 1956  A. E. BENSON  2,746,811
PNEUMATIC TRACK
Filed March 11, 1953
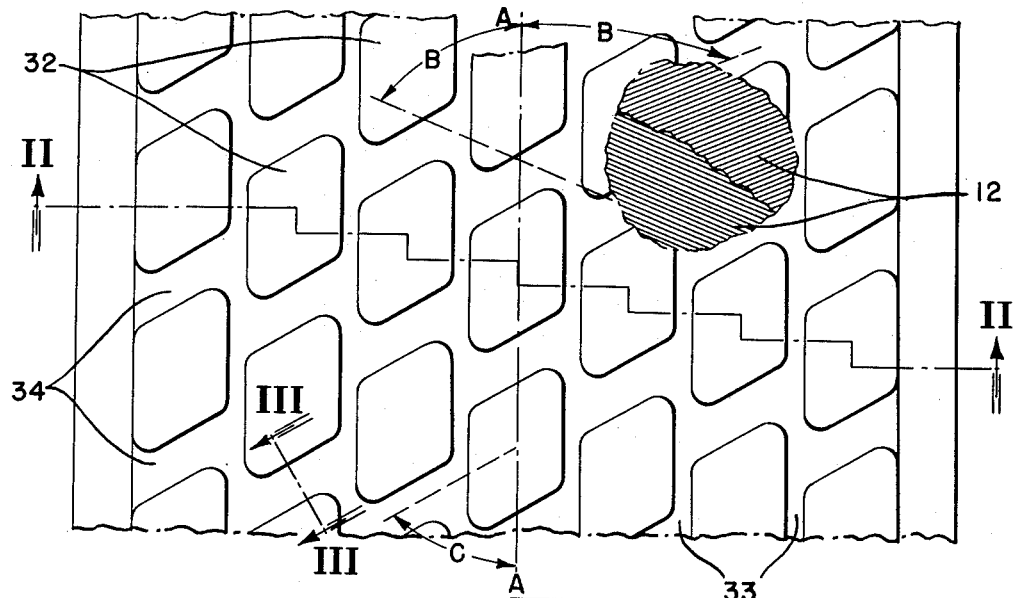
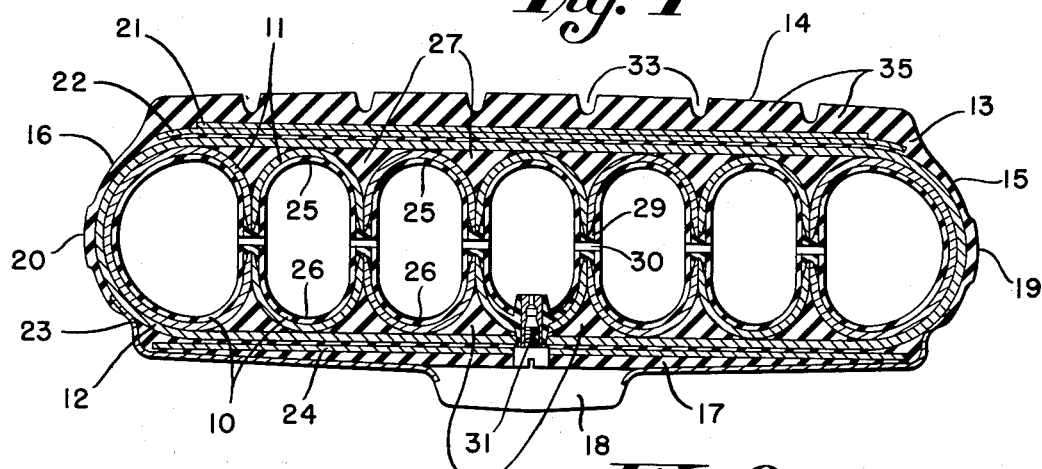
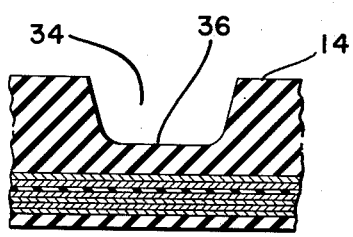
INVENTOR.
ARTHUR E. BENSON
BY Irwin M. Lewis
ATTORNEY.

United States Patent Office 2,746,811
Patented May 22, 1956

2,746,811

PNEUMATIC TRACK

Arthur E. Benson, Grosse Pointe Farms, Mich., assignor to United States Rubber Company, New York, N. Y., a corporation of New Jersey Application March 11, 1953, Serial No. 341,793

3 Claims. (Cl. 305—10)

This invention relates to inflatable, pneumatic type tracks for track laying vehicles.

More particularly, it relates to an inflatable track of the type having a plurality of tubular air chambers positioned in side by side parallel relationship so as to provide a track having a comparatively wide tread and comparatively small overall height. Tracks of this type are disclosed in copending application, Serial No. 341,084, filed March 9, 1953, by Ernst Eger, and copending application Serial No. 341,472, filed March 10, 1953, by Henry H. Kerr, Arthur E. Benson, Stewart P. Bower, and Leo E. Siess, both of which applications are assigned to the same assignee as the instant application.

The tread of a pneumatic type track, in contrast to conventional wheel tires, must be able to withstand extreme reversals of stresses. This is due to the fact that the track is formed as a continuous annular belt and is stretched to an oblong shape when placed around the spaced wheels of the vehicle on which it is to be used. The tread of the portion of the track that extends between the wheels is under compression while the tread of the portion which is bent around the wheel is under tension. When the vehicle is operated, the tread of the track is constantly flexed and subjected to cyclic reversal of stresses as the track passes around the wheels of the vehicle. This constant flexing and cyclic reversing of the stresses in the tread causes heat build-up power consumption, tread cracking, and tread wear.

The primary object of the present invention is to provide a track of the type having high angle reinforcing cords as described in application Serial No. 341,084, previously referred to, incorporating a novel tread configuration, which in addition to providing extremely good traction, is so related to the other structural features of the track as to give greater flexibility, greater resistance to cracking in the bases of the anti-skid grooves, less heat build-up, less power consumption and improved tread wear.

Other objects and advantages of the invention will become apparent from the following description when read in conjunction with the accompanying drawings wherein:

Fig. 1 is a plan view of a section of a pneumatic type track showing the novel tread configuration of the present invention and also showing by broken away section the relationship of the tread grooves forming the configuration and the body reinforcing cords of the track.

Fig. 2 is a sectional view taken on the line II—II of Fig. 1 showing the relative disposition of the longitudinally extending grooves with respect to the tubular air chambers.

Fig. 3 is a sectional view taken on the line III—III of Fig. 1 showing the shape of the transverse grooves that extend between the longitudinally extending grooves.

Fig. 1 of the drawing is a plan view of a section of a pneumatic track embodying the novel tread configuration of the present invention. For the purpose of illustration, only a small section of the track is shown, it being understood that the complete track is in the form of a continuous belt as described in co-pending application Serial No. 341,084, previously referred to, and that the tread configuration covers the entire tread of the track. The line A—A in Fig. 1, represents the longitudinal axis of the track.

The internal structure of the track is shown in Fig. 2, and is the same as that described in co-pending application Serial No. 341,472. Referring to Fig. 2, the track includes a plurality of longitudinally extending rubber tubes 10, positioned in side-by-side parallel relationship. The term "rubber" is used above and hereafter in its generic sense to include natural and synthetic rubbers and plastic materials exhibiting rubber-like properties or blends thereof.

One or more plies of reinforcing cords 11 surround each of the individual tubes 10 and one or more plies of reinforcing cords 12 surrounds the tubes 10 as a group. A rubber cover 13 surrounds the tubes 10 and provides a tread portion 14, sidewall portions 15 and 16, and base portion 17. Integral driving lugs such as shown at 18, may be provided on the base portion 17. Integral ribs 19 and 20 may be provided on the sidewalls 15 and 16 to protect them against scuffing.

Breaker strips 21 and 22 are provided in the tread portion 14 and a chafing strip 23 is provided in the base portion 17 and extends part way up the sidewall portions 15 and 16. One or more plies of reinforcing cords 24 are provided in the base portion 17 to prevent longitudinal stretching thereof. The reinforcing cords 11, 12 and 24, breaker strips 21 and 22 and chafing strip 23 may be either natural or synthetic textile or metallic. The reinforcing cords 11 and 12 are positioned to extend around the tubes 10 at an angle of between 60° and 90° to the longitudinal axis A—A of the track and the reinforcing cords 24 are positioned to extend at an angle of from between 0° and 20° to the longitudinal axis A—A of the track in the manner described in co-pending application Serial No. 341,472, previously referred to.

The tubes 10 are of substantially oblong shape of greater height than width in cross section. The end walls 25 and 26 of the tubes 10 are of semi-circular cross section so that that there is no tendency for them to deform on inflation of the tubes 10. Rubber filler strips 27 occupy the spaces between the semi-circular ends 25 of the adjacent tubes 10 and the tread portion 14 and rubber filler strips 28 occupy the spaces between the semi-circular ends 26 and the base portion 17. The filler strips 27 and 28 serve to position the tubes 10 within the cover 13.

Adjacent tubes 10 are interconnected by rubber grommets 29 which provide interconnecting passageways 30 so that all tubes may be inflated from a single valve 31 secured to one of the tubes 10. In Fig. 2 only one rubber grommet is shown, it being understood that similar grommets may be provided between each of the tubes 10.

Referring to Fig. 1, it can be seen that the exterior surface of the tread portion 14 is cut into a plurality of projecting blocks 32 by transversely spaced longitudinally extending grooves 33 and longitudinally spaced, transversely extending grooves 34. As best shown in Fig. 2, the longitudinally extending grooves 33 are positioned to overlie the filler strips 27 between the semi-circular ends 25 of the adjacent tubes 10 and the tread portion 14.

This particular positioning of the grooves 33 provides a number of advantages. One advantage is that it decreases the mass of material at this point thereby increasing the flexibility of the track and decreasing the heat build-up and power consumption. It is to be noted that the greatest mass of material of the track would normally be concentrated at the filler strips 27 and that therefore the greatest heat build-up and power consumption would be in this region. By positioning the grooves 33 adjacent the filler strips 27, the concentration of mass is considerably reduced with a corresponding decrease in heat build-up and power consumption. In addition, the provision of the grooves at this point provides for more heat transfer area so that any heat that might build up is rapidly dissipated.

Referring to Figs. 1 and 2, it will be noted that the longitudinally extending grooves 33 form longitudinal extending ribs 35 which are cut into the individual blocks 32 by the longitudinally spaced, transversely extending grooves 34. The grooves 34 in one rib are staggered in relationship to the grooves in an adjacent rib so that no single groove 34 is continuous transversely across the track and so that the blocks 32 in transversely adjacent ribs are staggered but overlapping. It has been found that by so staggering the grooves 34 in the adjacent ribs 35, that concentration of stresses along a single transverse hinge line across the track is eliminated and that a considerable reduction in cracking of the bases of the grooves results therefrom.

Referring to Fig. 1, it will be noted that the grooves 34 extend at an angle to the longitudinal axis A—A approximately equal to that at which the reinforcing cords 11 and 12 extend. As previously stated, the reinforcing cords 11 and 12 extend at an angle of between 60° and 90° to the axis A—A in accordance with the disclosure in co-pending application Serial No. 341,084. In Fig. 1, the angle at which the reinforcing cords 11 and 12 extend with respect to the axis A—A is indicated by the dimension B and the angle at which the grooves 34 extend with respect to the axis A—A is indicated by the dimension C. It has been found that by extending both the grooves 34 and reinforcing cords 11 and 12 at a high angle of between 60° and 90° to the axis A—A of the track, that power consumption and heat build-up is materially reduced and the flexibility of the track considerably increased. Very good results have been obtained when the angle B is 75° and the angle C is 60°.

Referring to Fig. 3, it will be noted that the transverse grooves 34 are comparatively wide with flat wide bases 36. By this construction the longitudinal strain or stretching and contraction of the tread is readily absorbed in the base portions 36 of the grooves 34 without cracking the base portions 36. This construction also reduces tread wear. This is due to the fact that as the stress in the tread changes from tension to compression as the track passes from the wheels to the straight run between the wheels there is necessarily a dimensional change in the tread of the track. If this dimensional change occurs in the blocks 32 which contact the road, there will be a "scrubbing" action between the road contacting surface of the blocks 32 and the road with resulting wear of the tread. By making the grooves 34 comparatively wide, the dimensional changes occur primarily in the bases 36 of the grooves 34 and the blocks 32 do not change appreciably with the result that the "scrubbing" action and tread wear resulting therefrom is materially reduced. In addition, there is less power consumption and heat build-up as the primary dimensional change is in the groove bases 36 where there is less bulk of material.

From the above description, it can be seen that there is provided a novel tread configuration which is so related with the internal construction of a pneumatic track of particular configuration, as to materially reduce power consumption, heat build-up, groove tracking, and tread wear and to materially increase the flexibility of the track.

While certain preferred embodiments of the invention have been disclosed and described, it is to be understood that changes and modifications may be made therein without departing from the spirit and scope of the invention.

Having thus described my invention, what I claim and desire to protect by Letters Patent is:

1. A pneumatic track comprising, a plurality of inflatable, longitudinally extending, flexible tubes positioned in side by side parallel relationship, reinforcing cords extending around the individual tubes and said tubes as a group at an angle of between 60° and 90° to the longitudinal axis of the track, a rubber cover surrounding said tubes and reinforcing cords and providing tread, sidewall and base portions, longitudinally spaced, transversely extending grooves in the exterior surface of said tread portion, said grooves extending transversely across the tread at substantially the same angle to the longitudinal axis of the track as said reinforcing cords.

2. A pneumatic track comprising, a plurality of inflatable, longitudinally extending, flexible tubes positioned in side by side parallel relationship, reinforcing cords extending around the individual tubes and said tubes as a group at an angle of between 60° and 90° to the longitudinal axis of the track, a rubber cover surrounding said tubes and reinforcing cords and providing tread, sidewall and base portions, transversely spaced longitudinally extending grooves in the exterior surface of said tread portion forming longitudinally extending ribs, a plurality of longitudinally spaced grooves extending transversely across each of said ribs to form a plurality of projecting blocks, said transversely extending grooves extending at substatially the same angle to the longitudinal axis of the tire as said reinforcing cords, said transverse grooves in one rib being offset longitudinally from the transverse grooves in an adjacent rib so that the projecting blocks are longitudinally staggered.

3. A pneumatic track comprising, a plurality of inflatable, longitudinally extending, flexible tubes positioned in side by side parallel relationship, reinforcing cords extending around said individual tubes and said tubes as a group, at an angle of between 60° and 90° to the longitudinal axis of the track, a rubber cover surrounding said tubes and reinforcing cords and providing tread, sidewall and base portions, the portion of the walls of said tubes adjacent the tread portion being semi-circular in cross section, longitudinally extending rubber filler strips between the semi-circular portions of the adjacent tubes and the tread portion, longitudinally extending grooves in the exterior surface of said tread portion overlying said filler strips forming longitudinally extending ribs, a plurality of longitudinally spaced grooves extending transversely across each of said ribs to form a plurality of projecting blocks, said longitudinally spaced grooves in one rib being offset longitudinally from the longitudinally spaced grooves in an adjacent rib so that the projecting blocks are longitudinally staggered, said longitudinally spaced grooves extending transversely across said ribs at approximately the same angle to the longitudinal axis of the track as said reinforcing cords.

References Cited in the file of this patent

UNITED STATES PATENTS

| | | |
|---|---|---|
| D. 92,418 | Miller | June 5, 1934 |
| 750,633 | Fiske | Jan. 26, 1904 |
| 1,057,232 | Gammeter | Mar. 25, 1913 |
| 1,679,444 | Pagenhart | Aug. 7, 1928 |
| 2,063,105 | King | Dec. 8, 1936 |
| 2,365,279 | Kraft | Dec. 19, 1944 |